US007856695B2

United States Patent
Tang et al.

(10) Patent No.: US 7,856,695 B2
(45) Date of Patent: Dec. 28, 2010

(54) STRUCTURE OF SUPPORTING ROTATION SHAFT

(75) Inventors: Chung-Hsun Tang, Sinjhuang (TW); Kang Han Cheng, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 0 days.

(21) Appl. No.: 12/123,844

(22) Filed: May 20, 2008

(65) Prior Publication Data
US 2009/0064460 A1    Mar. 12, 2009

(30) Foreign Application Priority Data
Sep. 7, 2007    (TW) .............................. 96215001 U

(51) Int. Cl.
*E05C 17/64* (2006.01)
(52) U.S. Cl. ...................................... 16/340
(58) Field of Classification Search .................. 16/340, 16/337, 338; 361/681, 682; 248/291.1, 371
See application file for complete search history.

(56) References Cited

U.S. PATENT DOCUMENTS

| 5,937,482 | A  | * | 8/1999  | Horng ....................... 16/340 |
| 6,065,187 | A  | * | 5/2000  | Mischenko ................. 16/341 |
| 6,175,990 | B1 | * | 1/2001  | Kato et al. .................. 16/334 |
| 6,347,433 | B1 | * | 2/2002  | Novin et al. ................. 16/367 |
| 6,698,063 | B2 | * | 3/2004  | Kim et al. .................... 16/337 |
| 6,796,541 | B2 | * | 9/2004  | Lu ........................... 248/291.1 |
| 7,251,129 | B2 | * | 7/2007  | Lee et al. ................... 361/683 |
| 7,444,716 | B2 | * | 11/2008 | Hsu ............................ 16/366 |
| 7,478,789 | B2 | * | 1/2009  | Yukawa et al. ............. 248/371 |
| 2007/0169313 | A1 | * | 7/2007 | Chen et al. .................. 16/340 |
| 2008/0068494 | A1 | * | 3/2008 | Kim ........................... 348/374 |

* cited by examiner

*Primary Examiner*—Victor Batson
*Assistant Examiner*—Matthew Sullivan
(74) *Attorney, Agent, or Firm*—Guice Patents PLLC

(57) ABSTRACT

A structure of supporting shaft rod includes a retaining member having a retaining sheet and a retaining shaft rod; and a mobile supporting member having two supporting racks. The retaining shaft rod is inserted through a mobile buckling sheet and a retaining buckling sheet of two latching units. Each mobile buckling sheet has a pair of mobile protruding bumps. Each retaining buckling sheet has a pair of retaining protruding bumps corresponding to the pair of mobile protruding bumps. A wearing-resistant ring is located between the mobile buckling sheet and the corresponding retaining buckling sheet. The retaining shaft rod is inserted through the wearing-resistant ring. An outer circumference of the wearing-resistant ring is located between interior surfaces of the pair of mobile protruding bumps of the mobile buckling sheet and the pair of retaining protruding bumps of the corresponding retaining buckling sheet and an exterior surface of the retaining shaft rod.

8 Claims, 7 Drawing Sheets

US 7,856,695 B2

STRUCTURE OF SUPPORTING ROTATION SHAFT

BACKGROUND OF THE INVENTION

1. Field of the Invention

The present invention relates to a structure of rotation shaft, more particularly to a structure of supporting rotation shaft which can be served as a supporting rack for a rear portion of an object to be supported and the tilting angle of the object to be supported is capable of being adjusted.

2. Description of Related Art

Two connected members having a relative connection angle are commonly seen and used in now days, such as door sheets; opening and closing two members are often defined as in an operating status and a non-operating status, e.g. a note book computer, an electronic dictionary, a portable audio/video displaying device.

The device whose relative angle can be adjusted often is mainly composed by a hinge; when applied to the note book computer mentioned above, the device is defined as a rotation shaft or a hinge device; regardless the definition of the device, theories of torque and friction are utilized in the device, the two members are respective provided with an engaging assembly that can be engaged to each other, such as a friction member or a cam member, and positioning of the open/close status is achieved by the two members engaging with each other.

A flat panel monitor, e.g. a liquid crystal monitor, a liquid crystal television or a plasma television, has advantages of light in weight, thin in thickness and no radiation, so a conventional CRT monitor is mostly replaced by the flat panel monitor. A supporting structure having a structure of rotation shaft is a must-have accessory for a flat panel monitor. The supporting structure often has a base seat on which a supporting rack is provided, and the structure of rotation shaft is provided between the flat panel monitor and the supporting rack, so the tilting angle of the flat panel monitor is capable of being adjusted.

A flat panel monitor can also be used as a displaying device that is equipped in a digital photo frame, the back portion of the digital photo frame usually has a retractable supporting rack so the digital phone frame can be tilted with an angle so as to stand on a table. But the fashion of the supporting rack connecting to the digital photo frame is a simple pivotal connection so only an open/close function can be provided, such art can be used in a small-size digital photo frame. But for one with a larger size, e.g. a 15-inch flat panel monitor or even a bigger one, the supportive rack is deemed as a bit too simple; for example, there is no resilient supporting unit provided so a function of adjusting the tilting angle is not available, so this kind of supporting rack can not be used in a big flat panel monitor. How to provide a structure of rotation shaft that has functions of storing and supporting and when applying an external force on the flat panel monitor the pivotally connected structure of rotation shaft can provide a function of adjusting the tilting angle becomes a obstacle to be overcome.

SUMMARY OF THE INVENTION

The applicant of the present invention has devoted himself to design and commercially rotation shafts with a wish that the above mention disadvantages that a tilting angle of a supporting rack can not be automatically adjusted can be overcome and wish to provide a structure of rotation shaft capable of being used as a supporting rack in which when an external force is applied to an object to be supported, the tilting angle of the structure of rotation shaft can be adjusted by the weight of the object itself, when the force applied on the structure of rotation shaft by the objected to be supported is released, energy is released by resilient supporting units and a mobile supporting member of the structure of rotation shaft is recovered to an initial operation angle, so the tilting angle is re-adjusted.

For achieving the object mentioned above, the present invention provides a structure of supporting rotation shaft, comprises a retaining member, a surface of a retaining sheet of the retaining member is protrudingly provided with a pair of sheet flanks that allow a retaining shaft rod pass through, two ends of the retaining shaft rod are respectively provided with a resilient supporting unit, two ends of each of the resilient supporting units are respectively connected to the retaining member and a mobile supporting member; the mobile supporting member mention above, two lugs adjacently to the corresponding resilient supporting units are protrudingly provided on two top ends of two supporting racks of the mobile supporting member, each of the lugs is passed through by the retaining shaft rod, two ends of the retaining shaft rod are respectively provided with a latching unit, each of the latching units is composed by a mobile buckling sheet provided at the outer side of each of the lugs and a retaining buckling sheet that allows the retaining shaft rod pass through and be positioned, two opposite surfaces of one of the mobile buckling sheets and the corresponding retaining buckling sheet are respectively and protrudingly provided with a pair of mobile protruding bumps and a pair of retaining protruding bumps, two ends of the retaining shaft rod are further and respectively provided with at least one resilient unit and then is connected to an end sealing member; by pulling the mobile supporting member, the pair of mobile protruding bumps of one of the mobile buckling sheets pass across the pair of retaining protruding bumps of the retaining buckling sheet provided adjacently to the mobile buckling sheet, so a storing status of the mobile supporting member is released and an initial operation status is therefore formed.

Another object of the present invention is to provide a structure of supporting rotation shaft rod, wherein an axial tube is provided between the two sheet flanks, the top end of the axial tube is radially provided with a through hole for allowing a conventional connecting unit pass through, so the conventional connecting unit can be fixed at a connecting hole predetermined at the center of the retaining shaft rod.

One another object of the present invention is to provide a structure of supporting shaft rod, wherein each of the resilient supporting units is provided with an interpose sleeve tube that is served to let the retaining shaft rod pass through. A wearing resistant ring that allows the retaining shaft rod pass through is respectively provided between each of the interpose sleeve tube and the corresponding sheet flank, each of the peripheries of the wearing resistant rings is inwardly provided with a latching tenon for being mounted in a latching slot concavely provided at the top end of each of the sheet flanks.

One another object of the present invention is to provide a structure of supporting shaft rod, wherein each of the peripheries of the mobile buckling sheets is inwardly provided with a buckling tenon that is mounted to a mounting slot provided at each periphery of the lugs.

One another object of the present invention is to provide a structure of supporting shaft rod, wherein an angle limiting device is provided between the mobile supporting member and the retaining member, the angle limiting device is that each of the peripheries of the lugs is concavely provided with an position limiting slot, each of the lugs is inwardly and adjacently provided with a position limiting sheet for allowing the retaining shaft rod pass through, a position limiting tenon respectively and protrudingly provided at the lateral of the periphery of each of the position limiting sheets is inserted and received in the corresponding position limiting slot. A wearing-resistant ring that allows the retaining shaft rod pass through is provided between the position limiting sheet and the corresponding lug.

One another object of the present invention is to provide a structure of supporting shaft rod, wherein a wearing-resistant ring that allows the retaining shaft rod pass through is provided between the mobile buckling sheet and the corresponding retaining buckling sheet.

DETAILED DESCRIPTION OF THE PREFERRED EMBODIMENT

Figure 1:
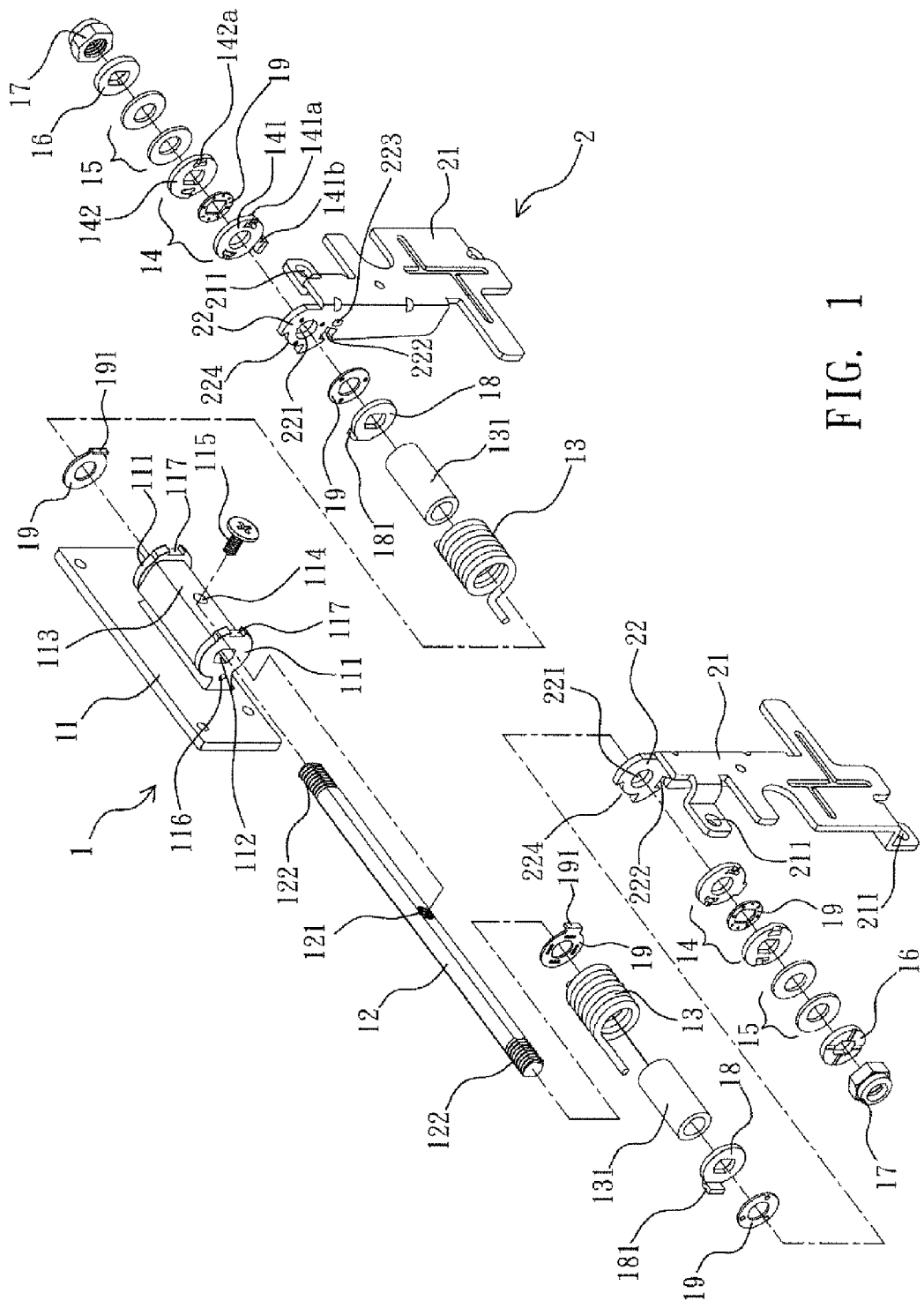
FIG. 1 is a 3D exploded view of the structure of supporting rotation shaft provided by the present invention.
Figure 2:
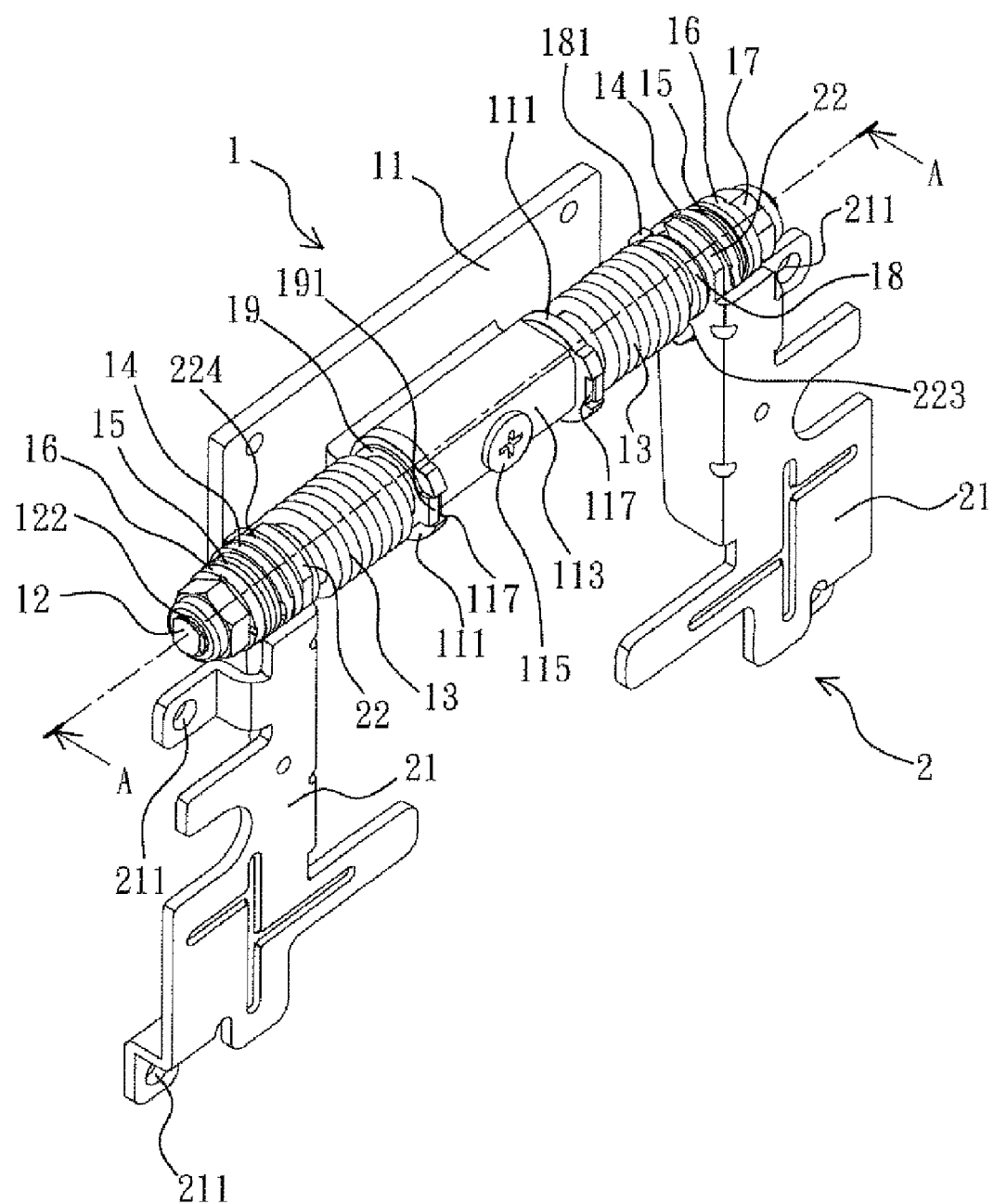
FIG. 2 is a 3D exploded view of the structure of supporting rotation shaft provided by the present invention after being assembled.
Figure 3:
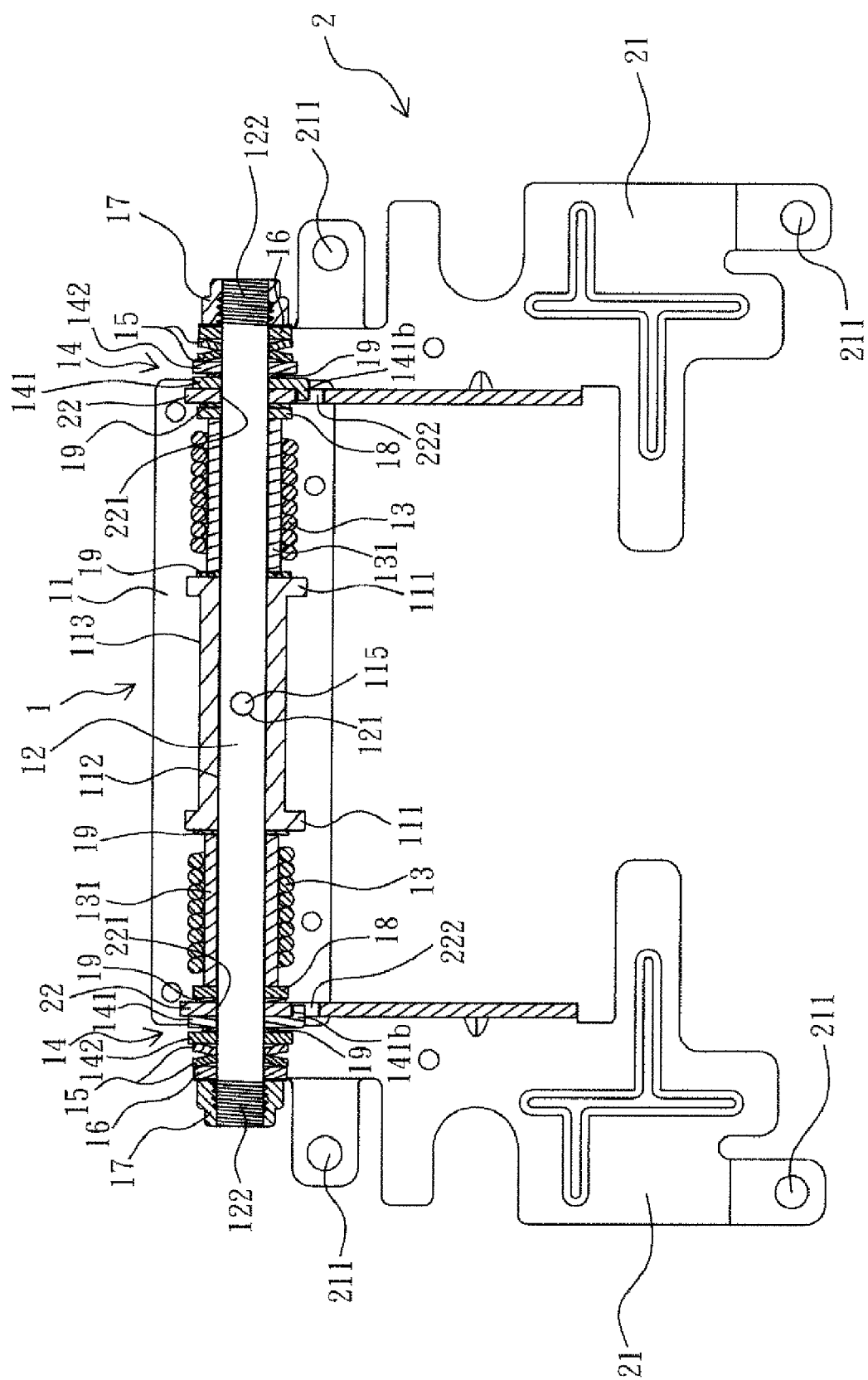
FIG. 3 is a cross-sectional view of FIG. 2 intercepted alongside a A-A line.

As shown from FIG. 1 to FIG. 3, the structure of supporting rotation shaft provided by the present invention is composed by a retaining member 1 and a mobile supporting member 2.

A pair of sheet flanks 111 are protrudingly provided on a surface of a retaining sheet 11 of the retaining member 1, a round shaped shaft hole 112 is respectively provided to each of the sheet flanks 111 for allowing a retaining shaft rod 12 axially pass through. As shown in FIG. 1, the retaining sheet 11 is formed by casting; in order to enhance the connecting strength between the retaining shaft rod 12 and the two sheet flanks 111, an axial tube 113 is provided between the two sheet flanks 111, and the top end of the axial tube 113 is radially provided with a through hole 114 for allowing a conventional connecting unit 115, e.g. a screw, pass through, so the conventional connecting unit 115 is fixed at a connecting hole 121 predetermined at the center of the retaining shaft rod 12, so the retaining shaft rod 12 would not generate idle motion.

Two ends of the retaining shaft rod 12 are respectively provided with a resilient supporting unit 13, e.g. a torsion spring, one end of one of the resilient supporting units 13 is mounted to a retaining spring hole 116 disposed at the bottom end of the corresponding sheet flank 111, one end of the other resilient supporting unit 13 is mounted to a mobile spring hole 223 mounted to a mobile supporting member 2, so the resilient supporting units 13 are not only provided with a function of supporting an object to be supported, e.g. a flat panel monitor, but also provided with functions of storing and releasing energy. In order to avoid the bias movement caused by rotations of one end of each of the resilient supporting units 13, so an interpose sleeve tube 131 is respectively provided within each of the resilient supporting units 13, and the interpose sleeve tubes 131 are served to let the retaining shaft rod 12 pass through.

Figure 4:
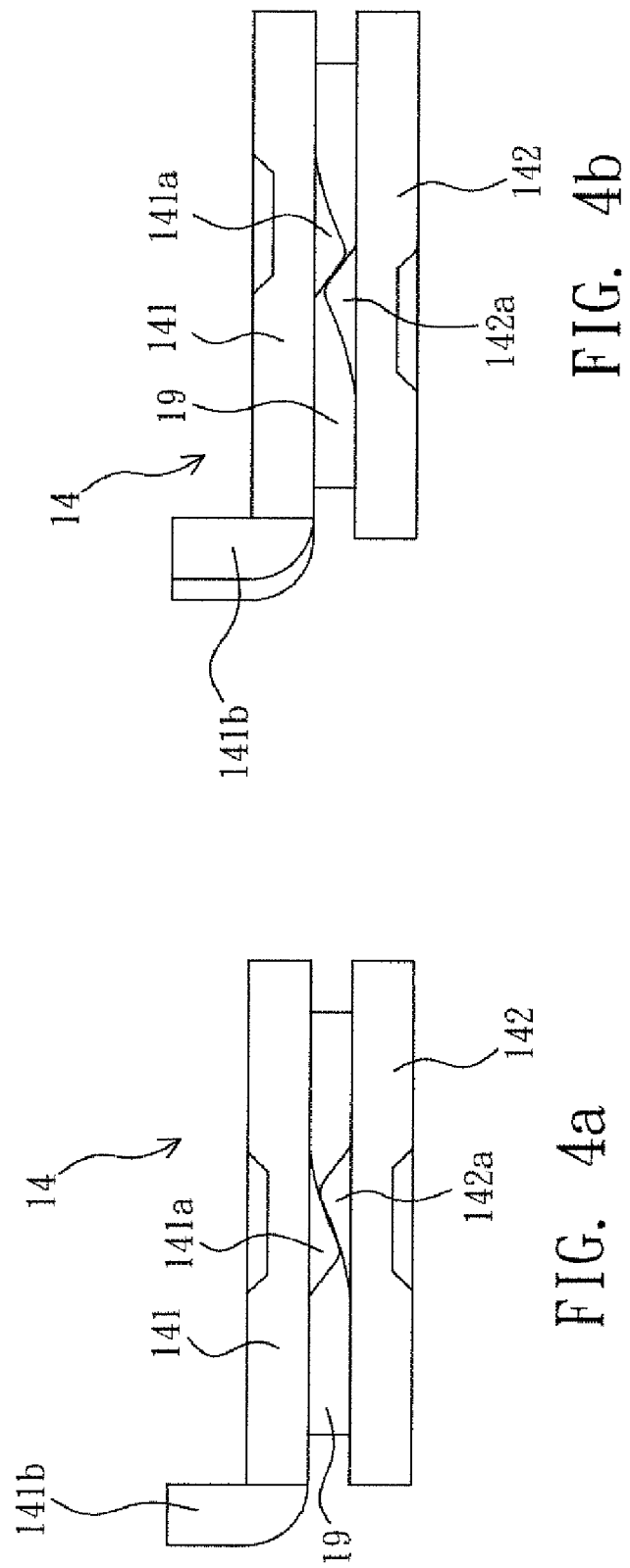
FIG. 4a is schematic view of the movement of the latching set before the mobile supporting member is pulled.
FIG. 4b is schematic view of the movement of the latching set after the mobile supporting member is pulled.

After two ends of the retaining shaft rod 12 further pass through lug holes 221 of lugs 22 axially and protrudingly provided at two ends of the mobile supporting member 2, each of the two ends of the retaining shaft rod 12 is respectively and adjacently connected to a latching set 14, each of the latching sets 14 is composed by a mobile buckling sheet 141 fixed at the outer side of the corresponding lug 22 and a retaining buckling sheet 142 served to let the retaining shaft rod 12 pass through and be positioned. Two opposite surfaces of the mobile buckling sheet 141 and the corresponding retaining buckling sheet 142 are radially and protrudingly and respectively provided with a pair of mobile protruding bumps 141a and a pair of retaining protruding bumps 142a. As shown in FIG. 1, each of the peripheries of the mobile buckling sheets 141 is inwardly provided with a buckling tenon 141b that is mounted to a mounting slot 222 provided at each periphery of the lugs 22, so the mobile buckling sheets 141 can rotate with the mobile supporting member 2 on the retaining shaft rod 12; as shown in FIG. 4, each of the pair of mobile protruding bumps 141a of each of the mobile buckling sheet 141 pass through each of the corresponding pair of retaining protruding bumps 142a of each of the corresponding retaining buckling sheet 142 provided adjacently to the mobile buckling sheet 141, so a storing status of the mobile supporting member 2 is released and an initial operation status is therefore formed.

Two ends of the retaining shaft rod 12 are further provided with at least a resilient unit 15, e.g. a disc resilient sheet, a wave-shaped resilient sheet or a spring, and a pressing pad 16, then two connecting sections 122 provided at two ends of the retaining shaft rod 12 are respectively connected to an end sealing member 17, e.g. an anti-releasing nut, so an axially-tightened structure of rotation shaft is obtained.

Two top ends of two supporting racks 21 of the mobile supporting member 2 are respectively provided with a lug 22, a rack hole 211 is provided at a proper location of each of the supporting racks 21, so a conventional connecting unit can be fixed on each of the supporting racks 21 for purposes of changing styles and appearances. Each of the lugs 22 is axially provided with a lug hole 221 for allowing the retaining shaft rod 12 pass through, each of the mounting slots 222 concavely provided at each periphery of the lugs 22 is served to let the corresponding buckling tenon 141b of the mobile buckling sheet 141 being mounted; a mobile spring hole 223 is further provided for letting the other end of the corresponding resilient supporting unit 13 being mounted.

An angle limiting device is provided between the mobile supporting member 2 and the retaining member 1, the angle limiting device is that each of the peripheries of the lugs 22 is concavely provided with an arc-shaped position limiting slot 224, each of the lugs 22 is inwardly and adjacently provided with a position limiting sheet 18 for allowing the retaining shaft rod 12 pass through, a position limiting tenon 181 respectively and protrudingly provided at the lateral of the periphery of each of the position limiting sheets 18 is inserted and received in the corresponding position limiting slot 224 for limiting the movement of the mobile supporting member 2 from a storing status to a maximum angle status.

A wearing-resistant ring 19 that allows the retaining shaft rod 12 pass through is respectively provided between the position limiting sheet 18 and the corresponding lug 22 and between the mobile buckling sheet 141 and the corresponding retaining buckling sheet 142, so the two adjacent sheet members can be prevented from being overly worn.

For avoiding wearing generated by the interpose sleeve tube 131 and the corresponding sheet flank 111 adjacent to the inner side of the interpose sleeve tube 131 due to a rotation movement, a wearing resistant ring 19 that allow the retaining shaft rod 12 pass through is respectively provided between the interpose sleeve tube 131 and the corresponding sheet flank 111, each of the peripheries of the wearing resistant rings 19 are protrudingly provided with a latching tenon 191 for being mounted in a latching slot 117 concavely provided at the top end of each of the sheet flanks 111, so the wearing resistant rings 19 are respectively fixed at each outer side of each of the sheet flanks 111.

Figure 5:
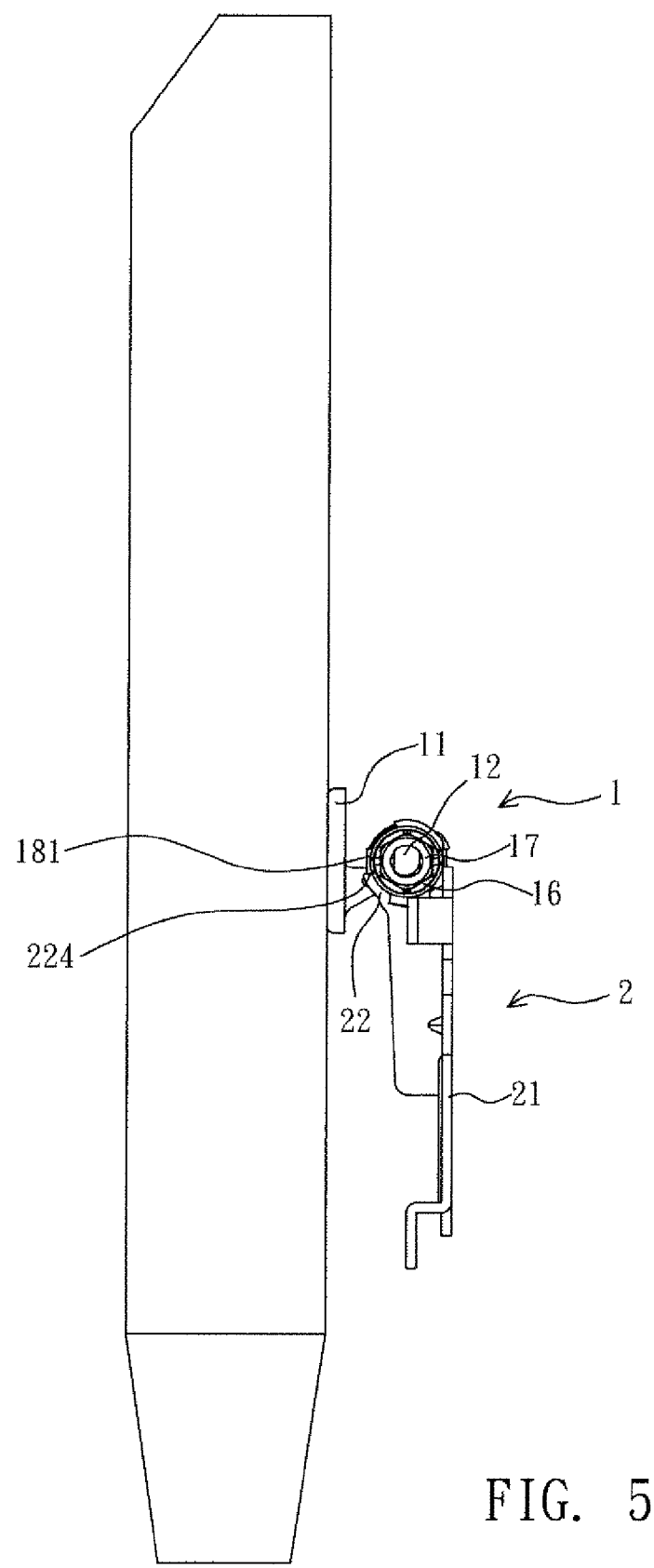
FIG. 5 is a schematic view of the structure of supporting rotation shaft provided by the present invention connected to an object to be supported.

As shown in FIG. 2, which is a 3D view of the present invention after being assembled, the two supporting racks 21 of the mobile supporting member 2 and the retaining sheet 11 are in parallel, and the retaining sheet 11 is connected to a rear portion of an object to be supported, e.g. a flat panel monitor, as shown in FIG. 5, each of the position limiting slots 224 of the mobile supporting member 2 is against the adjacent position limiting tenon 181 of the position limiting sheet 18, thus a storing status is formed.

Figure 6:
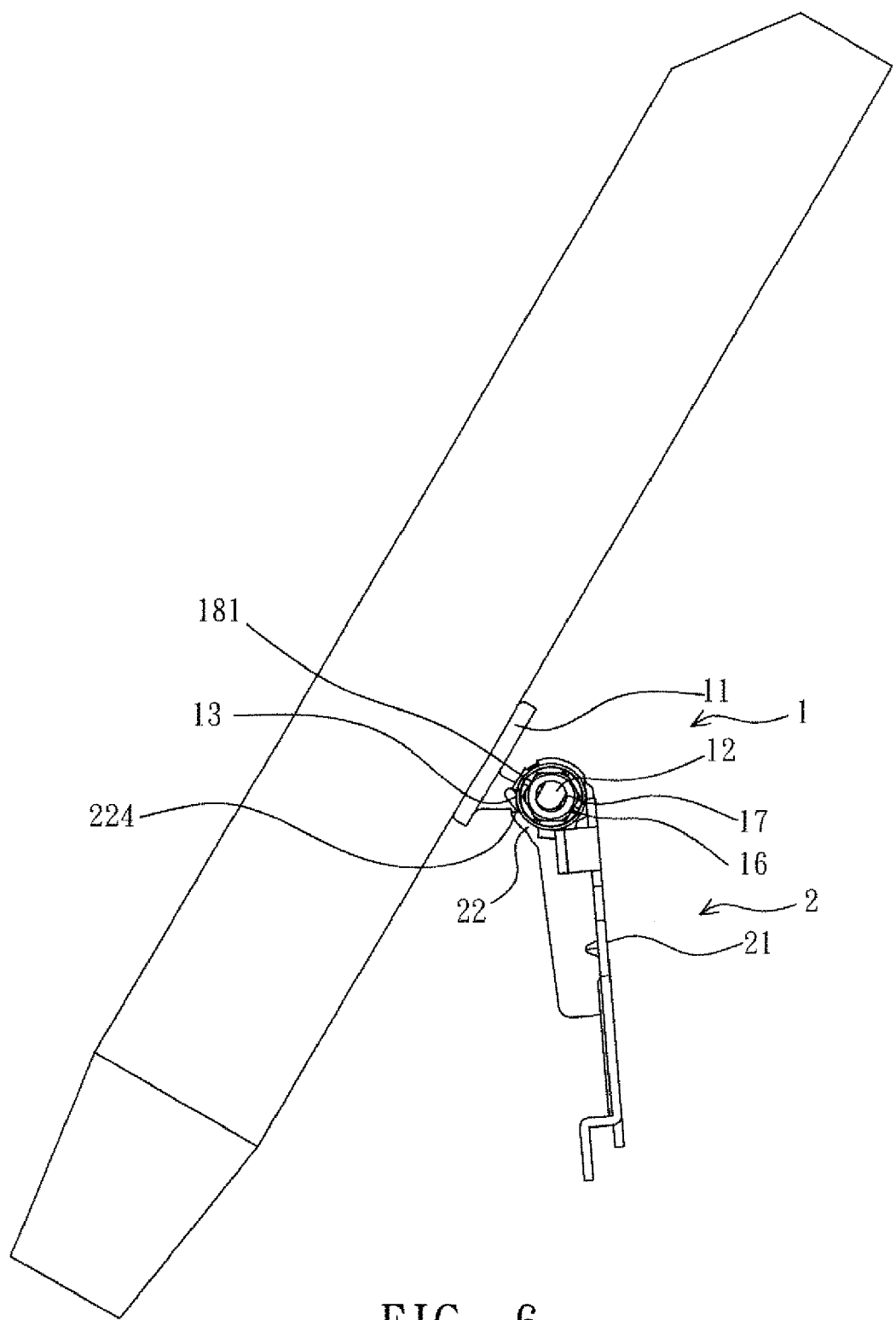
FIG. 6 is a schematic view of the structure of supporting rotation shaft being adjusted to an initial operation angle.

As shown in FIG. 4a and FIG. 4b, if the tilting angle of the object to be supported is desired to be adjusted, the mobile supporting member 2 is needed to be pulled outwardly, so each of the mobile buckling sheets 141 will rotate with the supporting racks 21, the two mobile protruding bumps 141a pass across the retaining protruding bumps 142a of the adjacent retaining buckling sheet 142, so the mobile supporting member 2 is in a status as shown in FIG. 6, in which the mobile supporting member 2 is backwardly rotated to an initial operation angle and energy is stored by the rotations of the resilient supporting units 13.

Figure 7:
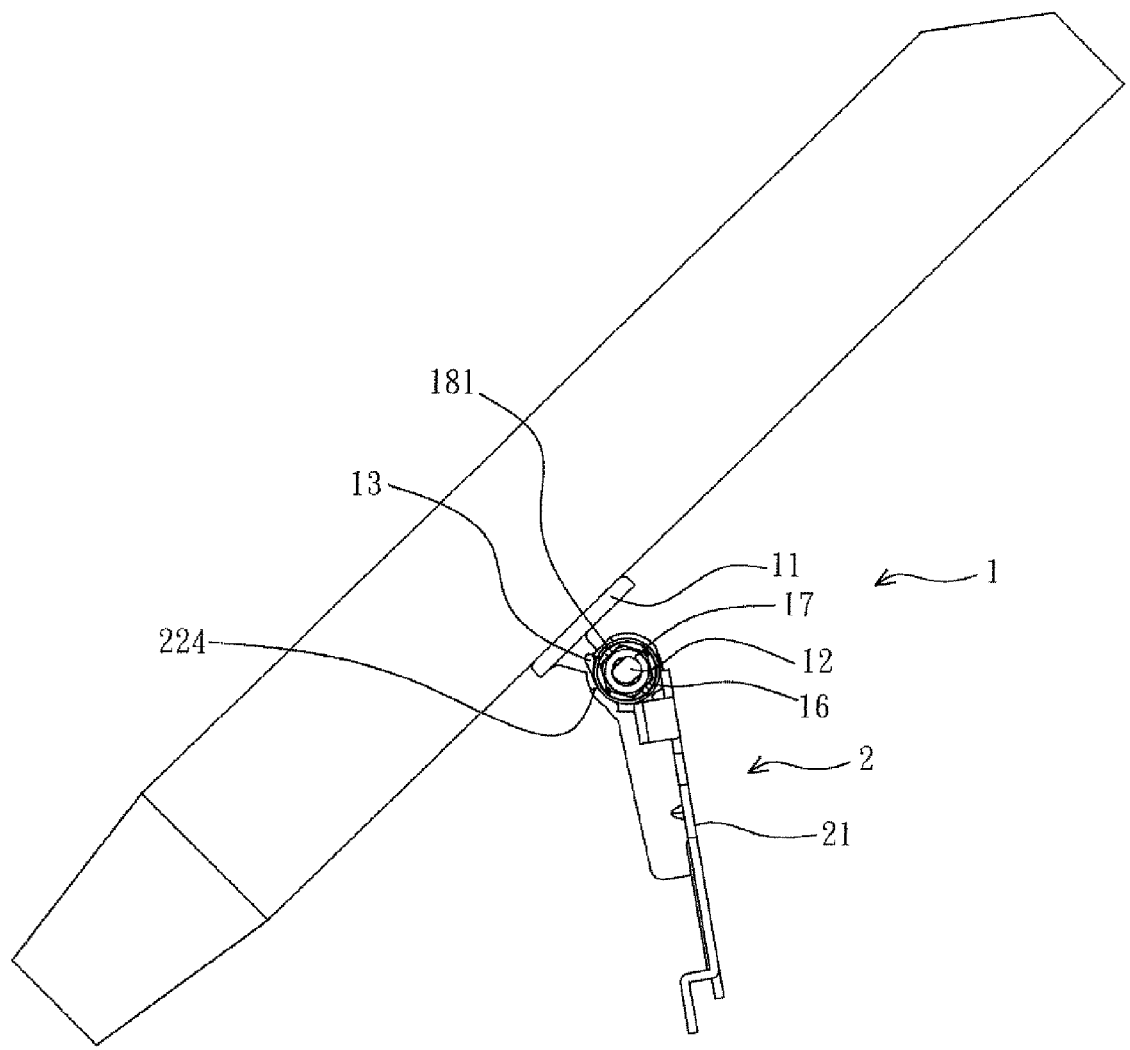
FIG. 7 is a schematic view of the structure of supporting rotation shaft being adjusted to a maximum operation angle.

As shown in FIG. 7, an external force is applied on the top end of the object to be supported, the tilting angle of the object to be supported can be continuously adjusted to the maximum tilting angle by the weight of the object itself, and a maximum energy storing status is obtained by the corresponding rotations of the resilient supporting units 13.

If the tilting angle is desired to be re-adjusted, the top end of the objected to be supported is needed to be pulled inwardly and the mobile supporting member 2 loses the effect caused by the external force so the stored energy is released by the resilient supporting units 13, the two mobile protruding bumps 141a of each of the mobile buckling sheets 141 are reversely rotated and against the two retaining protruding bumps 142a of the retaining buckling sheet 142 provided adjacently, as shown in FIG. 6, so the tilting angle is re-determined. If the two mobile protruding bumps 141a of each of the mobile buckling sheets 141 pass across the two retaining protruding bumps 142a of the retaining buckling sheet 142 provided adjacently, a storing status shown in FIG. 5 is obtained.

In the embodiment of the present invention, a structure of rotation shaft is directly provided to a rear portion of an object to be supported for replacing a conventional base seat and a supporting rack, and the needed supporting strength is still remained. By rotating a mobile supporting rack that is in a storing status, the corresponding movement of the latching set let the mobile supporting rack has an initial operation angle, then an external force is applied on the object to be supported, the adjustment from the initial operation angle to a maximum operation angle can be by the weight of the object itself. If the tilting angle is desired to be re-adjusted, the object to be supported is needed to be pulled and the mobile supporting member is released from the weight of the object, and energy is released by the resilient supporting units, so the mobile supporting member is recovered to the initial operation angle, so the tilting angle is re-determined.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A structure of supporting shaft rod comprising:

a retaining member having a retaining sheet and a retaining shaft rod, the retaining sheet has a pair of sheet flanks protruding outwardly, the retaining shaft rod is inserted through the pair of sheet flanks, each of two ends of the retaining shaft rod are inserted through one of two resilient supporting units, a first end of each the two resilient supporting units is connected to the retaining member and a second end of each the two resilient supporting units is connected to a mobile supporting member;

the mobile supporting member has two supporting racks, each of the two supporting racks has a lug protruding from a top end thereof and corresponding to one of the two resilient supporting units, the retaining shaft rod is inserted through each lug, each of two ends of the retaining shaft rod is respectively provided with one of two latching units, each of the two latching units has a mobile buckling sheet and a retaining buckling sheet, the mobile buckling sheet is located at an outer side of a corresponding lug of each of the two supporting racks, the retaining shaft rod is inserted through the mobile buckling sheet and the retaining buckling sheet of the each of the two latching units, each mobile buckling sheet has a pair of mobile protruding bumps protruding outwardly, each retaining buckling sheet has a pair of retaining protruding bumps protruding outwardly and corresponding to the pair of mobile protruding bumps of a corresponding mobile buckling sheet, each of the two ends of the retaining shaft rod is respectively provided with at least one resilient unit and then is connected to an end sealing member;

wherein, when the mobile supporting member is rotated, the pair of mobile protruding bumps of one of the mobile buckling sheets passing across the pair of retaining protruding bumps of the retaining buckling sheet provided adjacently to the mobile buckling sheet, and a storing status of the mobile supporting member is released and an initial operation status is therefore formed, wherein a wearing-resistant ring is located between the mobile buckling sheet and the corresponding retaining buckling sheet of each of the two latching units, the retaining shaft rod is inserted through the wearing-resistant ring, an outer circumference of the wearing-resistant ring is located between interior surfaces of the pair of mobile protruding bumps of the mobile buckling sheet and the pair of retaining protruding bumps of the corresponding retaining buckling sheet and an exterior surface of the retaining shaft rod.

2. The structure of supporting rotation rod as claimed in claim 1, wherein an axial tube is provided between the two sheet flanks, the top end of the axial tube is radially provided with a through hole for allowing a conventional connecting unit pass through, so the conventional connecting unit is fixed at a connecting hole predetermined at the center of the retaining shaft rod.

3. The structure of supporting rotation rod as claimed in claim 1, wherein each of the resilient supporting units is provided with an interpose sleeve tube that is served to let the retaining shaft rod pass through.

4. The structure of supporting rotation rod as claimed in claim 3, wherein a wearing resistant ring that allows the retaining shaft rod pass through is respectively provided between each of the interpose sleeve tube and the corresponding sheet flank, each of the peripheries of the wearing resistant rings is inwardly provided with a latching tenon for being mounted in a latching slot concavely provided at the top end of each of the sheet flanks.

5. The structure of supporting rotation rod as claimed in claim 1, wherein each of the peripheries of the mobile buckling sheets is inwardly provided with a buckling tenon that is mounted to a mounting slot provided at each periphery of the lugs.

6. The structure of supporting rotation rod as claimed in claim 1, wherein an angle limiting device is provided between the mobile supporting member and the retaining member, the angle limiting device is that each of the peripheries of the lugs is concavely provided with an position limiting slot, each of the lugs is inwardly and adjacently provided with a position limiting sheet for allowing the retaining shaft rod pass through, a position limiting tenon respectively and protrudingly provided at the lateral of the periphery of each of the position limiting sheets is inserted and received in the corresponding position limiting slot.

7. The structure of supporting rotation rod as claimed in claim 6, wherein a wearing-resistant ring that allows the retaining shaft rod pass through is provided between the position limiting sheet and the corresponding lug.

8. The structure of supporting rotation rod as claimed in claim 1, wherein the wearing-resistant ring is located between the pair of mobile protruding bumps of the corresponding mobile buckling sheet and the pair of retaining protruding bumps a corresponding retaining buckling sheet.

* * * * *